United States Patent [19]

Tanikake et al.

[11] Patent Number: 5,490,483
[45] Date of Patent: Feb. 13, 1996

[54] TWO-CYCLE INTERNAL COMBUSTION ENGINE

[75] Inventors: Makoto Tanikake; Yoshiki Morinaga; Katsuhiko Shirai; Masanori Shimada, all of Osaka, Japan

[73] Assignee: Daihatsu Motor Co., Ltd., Japan

[21] Appl. No.: 367,073

[22] Filed: Dec. 30, 1994

[30] Foreign Application Priority Data

| Feb. 23, 1994 | [JP] | Japan | 6-025216 |
| Apr. 12, 1994 | [JP] | Japan | 6-073006 |
| Apr. 12, 1994 | [JP] | Japan | 6-073007 |
| Aug. 23, 1994 | [JP] | Japan | 6-198275 |

[51] Int. Cl.⁶ ............................. F02B 25/14
[52] U.S. Cl. ............................. 123/65 P
[58] Field of Search ............ 123/65 W, 65 P, 123/65 PE, 65 A

[56] References Cited

U.S. PATENT DOCUMENTS

| 972,409 | 10/1910 | Swain | 123/65 W |
| 2,195,044 | 3/1940 | Zahren | 123/65 W |
| 4,638,770 | 1/1987 | Fox | 123/65 PE |
| 4,821,687 | 4/1989 | Iwai | 123/65 P |
| 5,040,496 | 8/1991 | Plohberger et al. | 123/65 W |
| 5,213,069 | 5/1993 | Curtil | 123/65 W |

FOREIGN PATENT DOCUMENTS

| 519677 | 3/1931 | Germany . | |
| 539849 | 12/1931 | Germany . | |
| 709639 | 8/1941 | Germany . | |
| 174500 | 9/1952 | Germany | 123/65 W |
| 1108000 | 3/1961 | Germany . | |
| 3933105A1 | 4/1990 | Germany . | |
| 4009429A1 | 10/1990 | Germany . | |
| 62-214229A | 3/1988 | Japan . | |
| 2-102318 | 4/1990 | Japan . | |
| 3-182620A | 11/1991 | Japan . | |
| 4-5429 | 1/1992 | Japan . | |
| 96625 | 8/1939 | Sweden | 123/65 W |
| 506583 | 5/1939 | United Kingdom | 123/65 W |

OTHER PUBLICATIONS

Dr. C. Stan, Dr. H. Seyfert, "Zur Entwicklung moderner schnellaufender Zweitakmotoren, in Kraftfahrzeugtechnik", Berlin 39 Apr. 1989, 8 pp. 228–232.

*Primary Examiner*—David A. Okonsky
*Attorney, Agent, or Firm*—Merchant, Gould, Smith, Edell, Welter & Schmidt

[57] ABSTRACT

A two-cycle internal combustion engine is provided which comprises: a cylinder receiving a reciprocative piston and having a top portion provided with a combustion chamber in which a spark plug faces; an exhaust port laterally opening into the cylinder; at least one first scavenging port opening into the cylinder at one side of the exhaust port; and at least one second scavenging port opening into the cylinder at another side of the exhaust port opposite to said one side. Each of the first and second scavenging ports directs scavenging gas away from the exhaust port. The first scavenging port opens into the cylinder with an upward inclination for directing a first portion of the scavenging gas upwardly toward the top portion of the cylinder, whereas the second scavenging port is oriented to direct a second portion of the scavenging gas transversely of the cylinder toward a wall portion of the cylinder where the first scavenging port is formed.

15 Claims, 8 Drawing Sheets

TWO-CYCLE INTERNAL COMBUSTION ENGINE

BACKGROUND OF THE INVENTION

1. Field of the Invention

This invention relates to a two-cycle internal combustion engine of the type which comprises a plurality of scavenging ports repetitively opened and closed by piston reciprocation for forcibly charging the cylinder while also displacing (scavenging) the residual gas.

2. Description of the Related Art

As is well known, a two-cycle internal combustion engine completes one cycle by two strokes (i.e., one reciprocation) of a piston within a cylinder. More specifically, combustion or explosion takes place at the upper deadpoint of the piston stroke followed by a downward stroke of the piston. As the piston approaches the lower deadpoint, an exhaust port is opened for discharging the combustion gas, which is followed by opening of scavenging ports for introducing a new charge which displaces or scavenges a residual portion of the combustion gas. Then, the piston makes an upward stroke for compressing the new charge, and the compressed new charge is again ignited at the upper deadpoint of the piston.

A typical prior art two-cycle engine is disclosed in FIGS. 8 through 12 of JP-A-1-102318 (Laid-open: Apr. 13, 1990) for example. Specifically, the two-cycle engine disclosed in this Japanese document comprises a cylinder receiving a reciprocating piston and having a top portion provided with a combustion chamber in which a spark plug faces, an exhaust port laterally opening into the cylinder, and an opposite pair of scavenging ports opening into the cylinder at both sides of the exhaust port.

With the prior art two-cycle engine described above, each of the scavenging ports is oriented to direct scavenging gas away from the exhaust port. Thus, the scavenging gas moves along a standing loop which first extends away from the exhaust port, then approaches the spark plug, and finally reaches the exhaust port. However, since the scavenging gas flows simply along the standing loop without any whirling or twisting, it has been found that a portion of the scavenging gas (i.e., charge gas) tends to blow by immediately into the exhaust port, thereby resulting in a decrease of the trapping efficiency (defined as the ratio of a cylinder-trapped portion of a new charge relative to the new charge after scavenging). Further, due to the formation of the standing loop, a portion of the combustion gas within the loop tends to be left non-scavenged, thereby leading to a decrease of the scavenging efficiency (defined as the ratio of a cylinder-trapped portion of a new charge relative to the total gas amount remaining in the cylinder after scavenging) accompanied by poor combustion.

JP-A-4-5429 (Laid-open: Jan. 9, 1992) discloses another prior art two-cycle engine which comprises a cylinder receiving a reciprocating piston and having a top portion provided with a combustion chamber in which a spark plug faces, an exhaust port laterally opening into the cylinder, a first pair of scavenging ports opening into the cylinder at one side of the exhaust port, a second pair of scavenging ports opening into the cylinder at another side of the exhaust port opposite to the first pair of scavenging ports, and a booster port opening into the cylinder at a position diametrically opposite to the exahust port. Again, each of the scavenging ports is oriented to direct scavenging gas away from the exhaust port, so that the scavenging gas basically moves along a standing loop which first extends away from the exhaust port, then approaches the spark plug, and finally reaches the exhaust port.

On the other hand, the booster port is oriented to direct a portion of the scavenging gas obliquely upward toward the spark plug. Thus, the scavenging gas portion introduced through the booster port stabilizes and accelerates the movement of the scavenging gas as a whole along the standing loop. Such stabilization and acceleration of the loop flow have been found effective for improving the trapping and scavenging efficiency (hence combustion performance) of the engine when the engine operates at a low delivery ratio (under a low load condition for example). Conversely, if the engine operates at a high delivery ratio (under a high load condition for example), the booster port excessively accelerates the loop scavenging flow, consequently leading to a decrease of the trapping and scavenging efficiency (hence poor combustion).

SUMMARY OF THE INVENTION

It is, therefore, an object of the present invention to provide a two-cycle internal combustion engine which is capable of preventing or reducing blow-by of the scavenging gas into the exhaust port.

It is also preferable if the two-cycle internal combustion engine is capable of improving the trapping efficiency and combustion performance under a low delivery ratio operating condition while retaining the above-described blow-by prevention.

It is further preferable if the two-cycle internal combustion engine is capable of improving the trapping efficiency and combustion performance not only under a low delivery ratio operating condition but also under a high delivery ratio operating condition while retaining the above-described blow-by prevention.

According to the present invention, there is provided a two-cycle internal combustion engine comprising: a cylinder in which a piston reciprocates, the clinder having a top portion provided with a combustion chamber in which a spark plug faces; an exhaust port laterally opening into the cylinder; at least one first scavenging port opening into the cylinder at one side of the exhaust port; and at least one second scavenging port opening into the cylinder at another side of the exhaust port opposite to said one side; wherein each of the first and second scavenging ports directs scavenging gas away from the exhaust port; and wherein the first scavenging port opens into the cylinder with an upward inclination for directing a first portion of the scavenging gas upwardly toward the top portion of the cylinder, while the second scavenging port is oriented to direct a second portion of the scavenging gas transversely of the cylinder toward a wall portion of the cylinder where the first scavenging port is formed.

With the arrangement described above, since each of the first and second scavenging ports directs the scavenging gas away from the exhaust port, the scavenging gas basically moves along a standing loop which first extends away from the exhaust port, then approaches the spark plug, and finally reaches the exhaust port. At the same time, however, the first scavenging port directs the first portion of the scavenging gas obliquely upwardly toward the top portion of the cylinder, wheras the second scavenging port directs the second portion of the scavenging gas transversely toward the first scavenging port for joining the upwardly directed second portion of the scavenging gas. Thus, the scavenging gas as a whole also whirls or twists due to a large injection angle difference between the two portions of the scavenging gas as it moves along the standing loop. As a result, it is possible to prevent the scavenging gas from blowing by into the exhaust gas, thereby increasing the trapping efficiency as well as the scavenging efficiency. Obviously, the increase of the trapping and scavenging efficiency leads to an output increase of the engine, a purification of the exhaust gas, and a reduction of the feul consumption.

It should be understood that the term "scavenging gas" as used herein means either air alone when a fuel injection valve supplies fuel directly into the combustion chamber, or "air-fuel mixture" when no such valve is provided.

The second scavenging port may open into the cylinder generally perpendicularly to an axis of the cylinder. Alternatively, the second scavenging port may open into the cylinder upward at a small inclination angle of no more than 15 degrees relative to a plane perpendicular to an axis of the cylinder.

According to a preferred embodiment of the present invention, the piston has a top face provided with a ridge adjacent to the first scavenging port, the ridge having, on a side thereof away from the first scavenging port, a deflecting guide face for deflecting the second portion of the scavenging gas obliquely upward. The ridge may extend to a position facing the exhaust port. Further, the ridge may have, on a side thereof facing the first scavenging port, a non-deflecting guide face inclined substantially in parallel to the first scavenging port.

Preferably, the combustion chamber may be offset away from the exhaust port but close to the first scavenging port. In this case, it is further advantageous if the combustion chamber has a first steep wall portion located closer to the exhaust port, and a second steep wall portion located closer to the second scavenging port.

According to another preferred embodiment of the present invention, the engine may further comprise a booster port at a portion of the cylinder opposite to the exhaust port, wherein the booster port opens into the cylinder with an upward inclination for directing a third portion of the scavenging gas upwardly toward the spark plug. The booster port may be also inclined laterally for directing the third portion of the scavenging gas toward the first scavenging port.

The engine may further comprise means for delaying an opening time of the booster port relative to the first and second scavenging ports during each downward stroke of the piston. Typically, the delaying means may comprise a ridge formed on top of the piston in facing relation to the booster port.

The booster port may be provided with a valve, in particular a rotary valve, for controlling opening of the booster port. In this case, the valve may be operated by an actuator which functions to open the valve under a low delivery ratio operating condition while also functioning to close the valve under a high delivery ratio operating condition.

Other objects, features and advantages of the present invention will be fully understood from the following detailed description given with reference to the accompanying drawings.

DETAILED DESCRIPTION OF THE PREFERRED EMBODIMENTS

Figure 1:
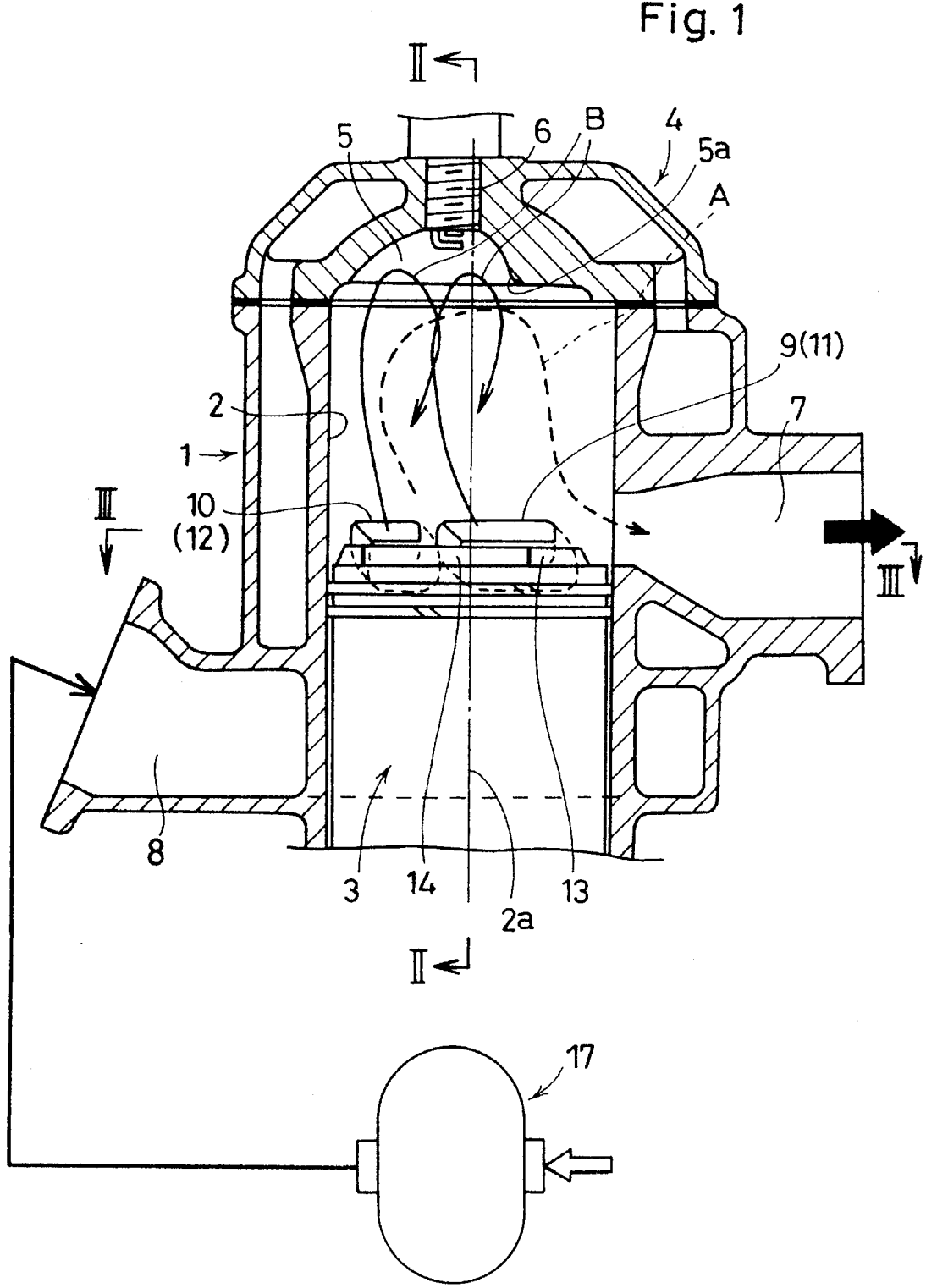
FIG. 1 is a view, in vertical section, showing a two-cycle internal combustion engine according to a first embodiment of the present invention.
Figure 2:
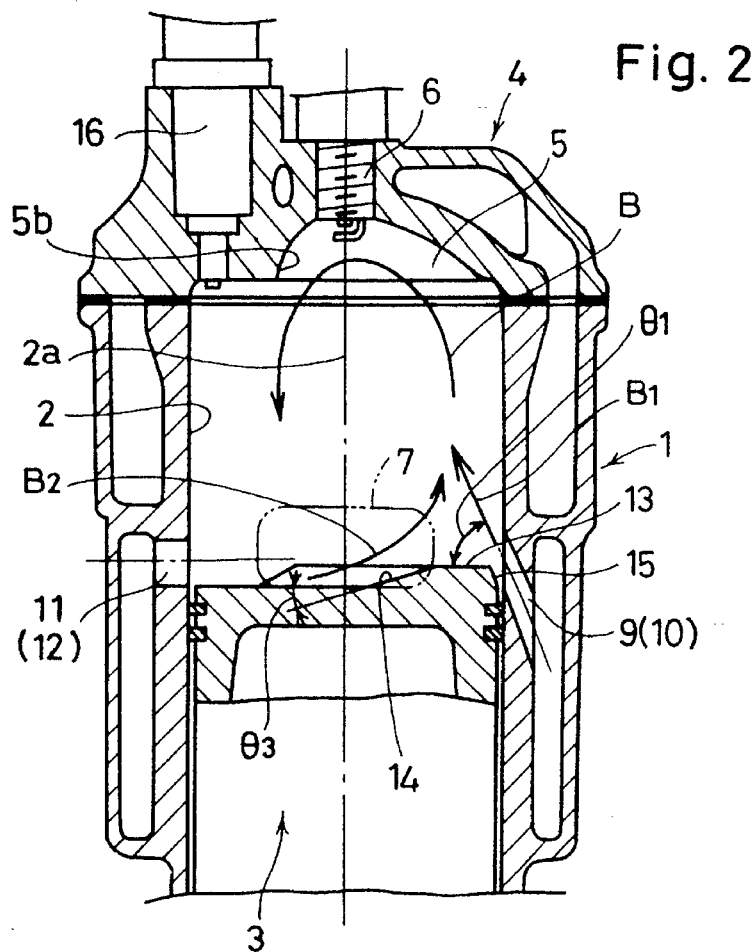
FIG. 2 is a sectional view taken on lines II—II in FIG. 1.
Figure 3:
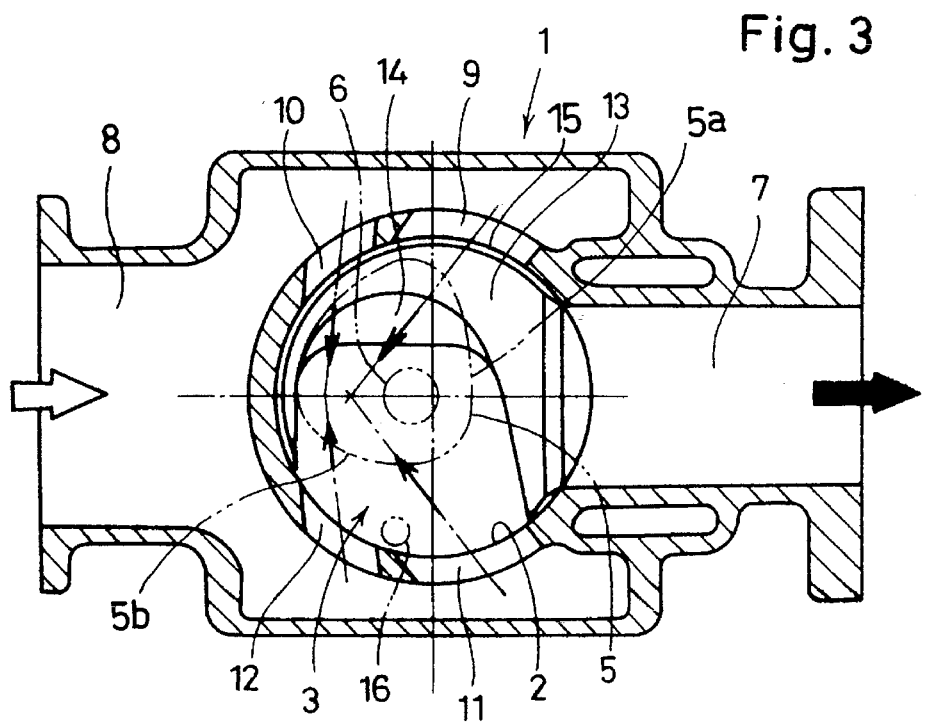
FIG. 3 is a sectional view taken along lines III—III in FIG. 1.

FIGS. 1 to 3 of the accompanying drawings show a first embodiment of the present invention. In these figures is shown a cylinder block 1 for a two-cycle internal combustion engine. The cylinder block 1 has a cylinder 2 in which a piston 3 reciprocates vertically. The cylinder block 1 has an upper end fixedly fitted with a cylinder head 4 which has a downwardly directed recess for defining a combustion chamber 5.

The cylinder head 4 is provided, generally at its center, with a spark plug 6 having a sparking portion facing the combustion chamber 5. Further, the cylinder head 4 is also provided with a fuel injection valve 16 for directly injecting fuel into the cylinder 2.

On one side of the cylinder block 1, there is provided an exhaust port 7 opening laterally into the cylinder 2. On the opposite side of the cylinder block 1, there is also provided a charging inlet 8 connected to a displacement type compresser 17, such as a Roots blower, which is driven by the two-cycle engine itself. As is well known in the field of two-cycle engines, the displacement type compresser 17 may be constituted by a crankcase (not shown) below the cylinder block 1 and the piston 3.

As shown in FIG. 3, the cylinder 2 is flanked by a first pair of scavenging ports 9, 10 on one lateral side of the exhaust port 7 as well as by a second pair of scavenging ports 11, 12 on the opposite lateral side of the exhaust port 7. These scavenging ports 9–12 are equally connected to the charging inlet 18 and oriented, in plan view, to feed a scavenging or charge gas (i.e., air in the first embodiment because of direct fuel injection) into the cylinder 2 in a direction away from the exhaust port 7. As a result, the scavenging gas introduced through the scavenging ports 9–12 is made to move along a standing loop which first extends away from the exhaust port 7, then approaches the spark plug 6, and finally turns to the exhaust port 7, as indicated by a broken line arrow A in FIG. 4. This manner of scavenging is referred to as "loop scavenging" or "reverse scavenging".

According to the first embodiment, the first pair of scavenging ports 9, 10 is inclined by a relatively large angle θ1 relative to a plane perpendicular to an axis 2a of the cylinder 2, as shown in FIG. 2. As a result, a portion of the scavenging gas introduced through the first pair of scavenging ports 9, 10 is directed upwardly toward the cylinder head 4 (namely, the top portion of the cylinder 2), as indicated by an arrow B1 in FIG. 2.

On the other hand, the second pair of scavenging ports 11, 12 extends generally perpendicularly to the axis 2a of the cylinder 2. As a result, another portion of the scavenging gas introduced through the second pair of scavenging ports 11, 12 traverses the cylinder 2 toward an opposite wall portion of the cylinder 2 where the first pair of scavenging ports 9, 10 is formed, as indicated by an arrow B2 in FIG. 2. Further, the scavenging gas portion B2 introduced through the second pair of scavenging ports 44, 12 combines with the scavenging gas portion B1 introduced through the first pair of scavenging ports 9, 10 to generate a turning flow, as indicated by an arrow B in FIG. 2.

As a net result, the scavenging gas as a whole introduced into the cylinder 2 through the respective scavenging ports 9–12 moves basically along the main standing loop A but also whirls transversely of the main standing loop A. Thus, it is possible to significantly prevent the scavenging gas from blowing by into the exhaust port 7, thereby greatly increasing the trapping efficiency (defined as the ratio of a cylinder-trapped portion of a new charge relative to the new charge after scavenging) as well as the scavenging efficiency (defined as the ratio of a cylinder-trapped portion of a new charge relative to the total gas amount remaining in the cylinder after scavenging).

The experiments performed by the inventors have revealed that the second pair of scavenging ports 11, 12 may be upwardly inclined by no more than 15 degrees relative to a plane perpendicular to the axis 2a of the cylinder 2 without unduly detracting from the advantages obtainable by the arrangement wherein the second pair of scavenging ports 11, 12 are substantially perpendicular to the cylinder axis 2a. Further, the first pair of scavenging ports 9, 10 as well as the second pair of scavenging ports 11, 12 may be equally replaced by a single scavenging port.

According to the first embodiment, the piston 3 has a top face formed with a ridge 13 which extends partially along the circumference of the piston 3, as shown in FIGS. 2 and 3. Specifically, the ridge 13 extends at least from a portion facing the first pair of scavenging ports 9, 10 to another portion facing the exhaust port 7.

The ridge 13 is provided, at its portion directed toward the second pair of scavenging ports 11, 12, with a deflecting guide face 14 which is inclined upwardly toward the first pair of scavenging ports 9, 10 by an angle of preferably about 20 degrees for upwardly deflecting the portion of the scavenging gas introduced through the second pair of scavenging ports 12. The deflecting guide face 14 may be either flat or concavely curved.

Due to the provision of the deflecting guide face 14, the scavenging gas portion introduced through the second pair of scavenging ports 11, 12 is deflected upward (arrow B2) for smoothly joining the upward scavenging gas portion (arrow B1) introduced through the first pair of scavenging ports 9, 10 without hindering the flow of the latter. As a result, a strong whirling motion (arrow B) can be imparted to the scavenging gas as a whole within the cylinder 2.

On the other hand, the ridge 13 is also provided, at its portion facing the first pair of scavenging ports 9, 10 with a non-deflecting guide face 15 which is inclined generally in parallel to the first pair of scavenging ports 9, 10. The non-deflecting guide face 15 strengthens the directivity of the scavenging gas portion introduced through the first pair of scavenging ports 9, 10, thereby additionally increasing the whirling tendency (arrow B) of the whole scavenging air to improve the trapping and scavenging efficiency.

As described above, the ridge 13 extends to a portion facing the exhaust port 7. Such an arrangement is preferred because the scavenging gas introduced into the cylinder 2 through the respective scavenging ports 9–12 is prevented from blowing by (passing by) through the exhaust port 7. As a result, it is possible to additionally improve the trapping and scavenging efficiency.

Further, according to the first embodiment, the recess of the cylinder head 4 for defining the combustion chamber 5 is located offset away from the exhaust port 7 but close to the first pair of scavenging ports 9, 10. Further, the chamber forming recess 5 has a first steep wall portion 5a located closer to the exhaust port 7, and a second steep wall portion 5b located closer to the second pair of scavenging ports 11, 12.

According to the above-described arrangement and configuration of the combustion chamber 5, the scavenging gas introduced through the respective scavenging ports 9–12 partially impinges on the first steep wall portion 5a of the combustion chamber 5 due to its movement along the standing loop A (see FIG. 1). Further, the scavenging gas also impinges partially on the second steep wall portion 5b of the chamber 5 due to its whirling motion B (see FIG. 2). As a result, the combustion chamber 5 is capable of trapping a fresh and fuel-rich portion of the air-fuel charge which is subsequently compressed by the upward movement of the reciprocating piston 3 for starting ideal combustion.

FIGS. 4 to 7 of the accompanying drawings show a second embodiment of the present invention. In this embodiment, a cylinder block 1' for a two-cycle internal combustion engine has a cylinder 2' in which a piston 3' reciprocates vertically. The cylinder block 1' also has an upper end fixedly fitted with a cylinder head 4' which has a downwardly directed recess for defining a combustion chamber 5'.

Like the first embodiment, the cylinder head 4' is provided, at its center, with a spark plug 6' having a sparking portion facing the combustion chamber 5'. However, the cylinder head 4' of the second embodiment has no fuel injection valve.

On one side of the cylinder block 1', there is provided an exhaust port 7' opening laterally into the cylinder 2'. On the opposite side of the cylinder block 1', there is also provided a charging inlet 8' which is supplied with an air-fuel mixture as a scavenging or charge gas.

Figure 4:
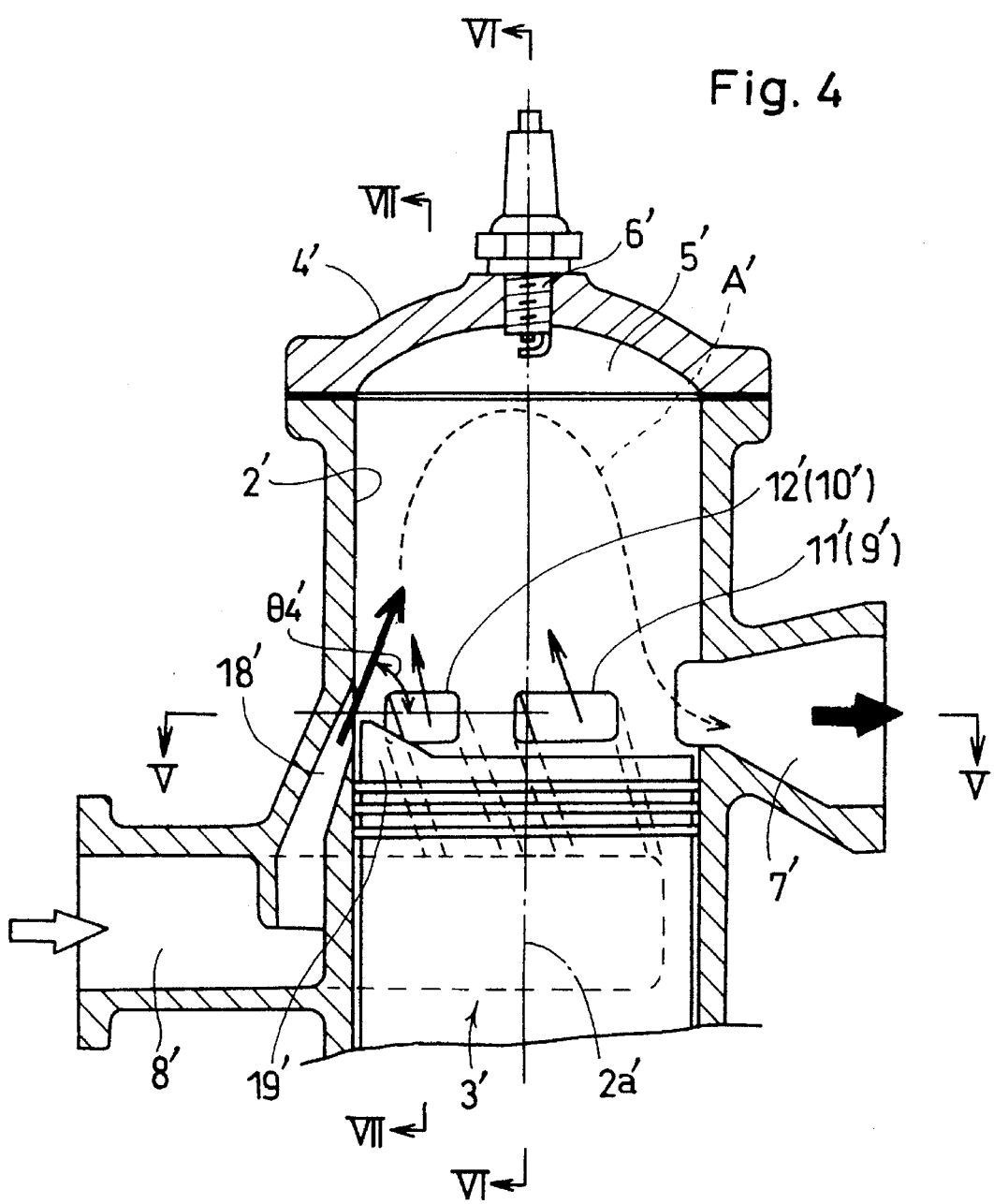
FIG. 4 is a view, in vertical section, showing a two-cycle internal combustion engine according to a second embodiment of the present invention.
Figure 5:
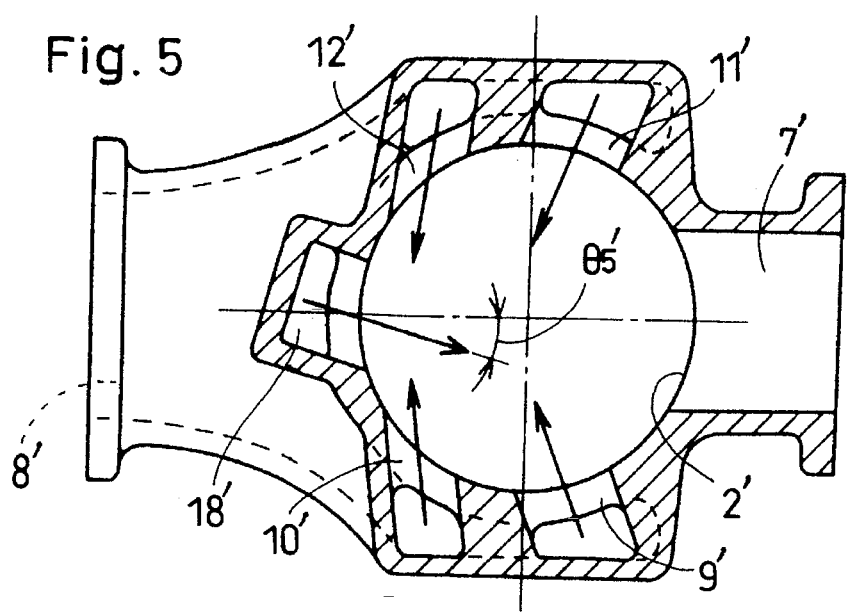
FIG. 5 is a sectional view taken on lines V—V in FIG. 4.

As shown in FIG. 5, the cylinder 2' is flanked by a first pair of scavenging ports 9', 10' on one lateral side of the exhaust port 7' as well as by a second pair of scavenging ports 11', 12' on the opposite lateral side of the exhaust port 7'. These scavenging ports 9'–12' are equally connected to the charging inlet 18' (see FIGS. 5–7) and oriented away from the exhaust port 7'. As a result, the scavenging gas introduced through the scavenging ports 9'–12' is made to move along a standing loop which first extends away from the exhaust port 7', then approaches the spark plug 6', and finally turns to the exhaust port 7', as indicated by a broken line arrow A' in FIG. 4.

Figure 6:
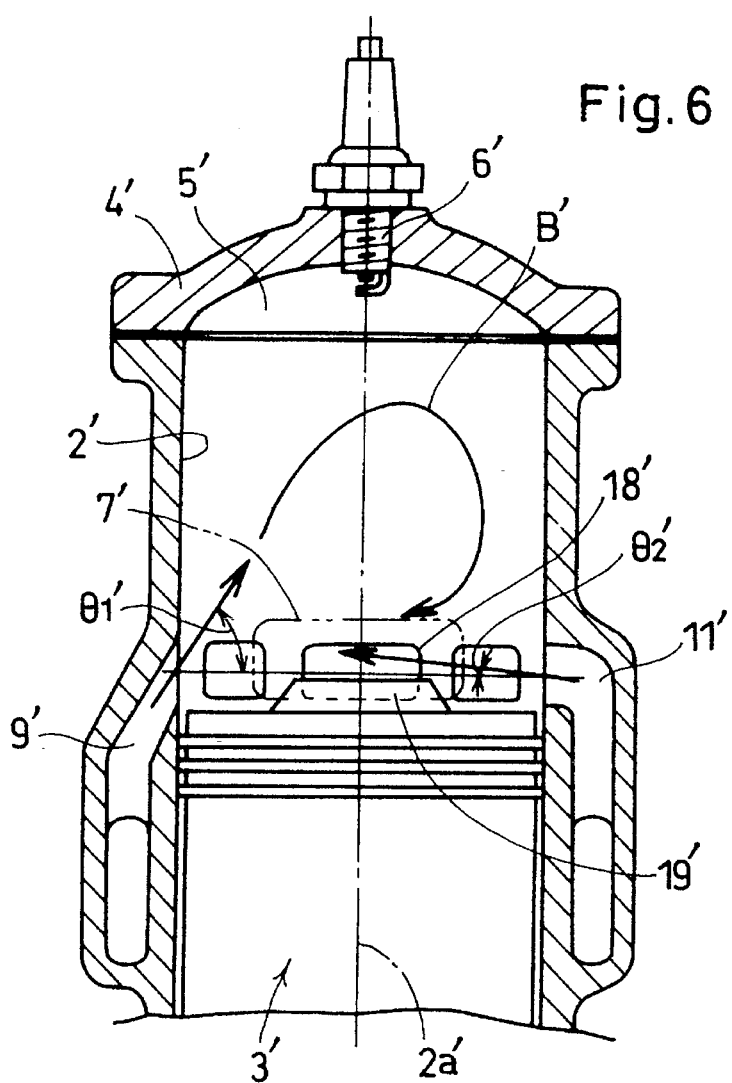
FIG. 6 is a sectional view taken on lines VI—VI in FIG. 4.
Figure 7:
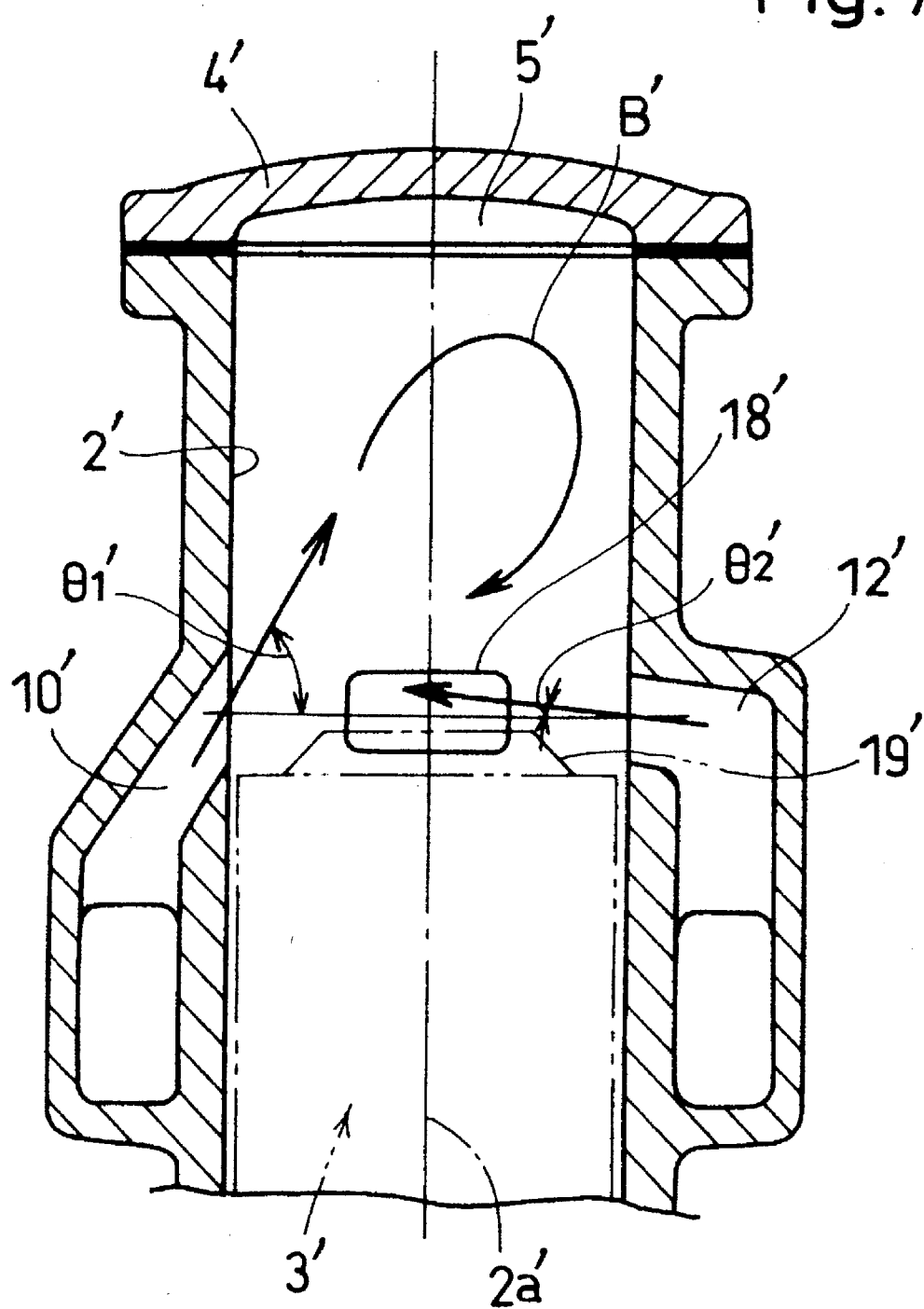
FIG. 7 is a sectional view taken along lines VII—VII in FIG. 4.

The first pair of scavenging ports 9', 10' is inclined by a relatively large angle θ 1' relative to a plane perpendicular to an axis 2a' of the cylinder 2', as shown in FIGS. 6 and 7. As a result, a portion of the scavenging gas introduced through the first pair of scavenging ports 9', 10' is directed upwardly toward the cylinder head 4'.

On the other hand, the second pair of scavenging ports 11', 12' is inclined by a small angle θ 2' of no more than 15 degrees relative to a plane perpendicular to the axis 2a' of the cylinder 2', as also shown in FIGS. 6 and 7. As a result, another portion of the scavenging gas introduced through the second pair of scavenging ports 11', 12' traverses the cylinder 2' toward an opposite wall portion of the cylinder 2' where the first pair of scavenging ports 9', 10' is formed. Further, the scavenging gas portion introduced through the second pair of scavenging ports 11', 12' joins with the scavenging gas portion introduced through the first pair of scavenging ports 9', 10' to generate a turning flow, as indicated by an arrow B' in FIGS. 6 and 7. Of course, the second pair of scavenging ports 11', 12' may extend generally perpendicularly to the axis 2a' of the cylinder 2', like the first embodiment.

As a net result, the scavenging gas as a whole introduced into the cylinder 2' through the respective scavenging ports 9'–12' moves basically along the main standing loop A' but also whirls transversely of the main standing loop A'. Thus, it is possible to significantly prevent the scavenging gas from blowing by into the exhaust port 7', thereby greatly increasing the trapping and scavenging efficiency.

According to the second embodiment, the cylinder block 1' is additionally provided with a booster port 18' opening into the cylinder 2' at a position opposite to the exhaust port 7'. The booster port 18' communicates with the charging inlet 8' and is inclined upwardly toward the spark plug 6' by a relatively large angle θ 4' relative to a plane perpendicular to the axis 2a' of the cylinder 2', as shown in FIG. 4. The booster port 18' serves to improve the trapping efficiency, scavenging efficiency and combustion performance of the engine at a low load operation wherein the delivery ratio (scavenging ratio) inevitably tends to decrease.

On the other hand, the booster port 18' may hinder the whirling motion B' of the scavenging gas within the cylinder 2' if no countermeasure is taken. According to the second embodiment, therefore, the following countermeasures are taken to prevent such a problem.

First, as shown in FIGS. 4 and 6, the piston 3' has a top face formed with a ridge 19' at a peripheral portion facing the booster port 18'. The ridge 19' delays the opening of the booster port 18' by a predetermined time (i.e., by a predetermined crank angle) relative to that of the respective scavenging ports 9'–12' during each downward stroke of the piston 3'. As a result, the scavenging gas is first introduced only through the respective scavenging ports 9'–12' to start moving along the standing loop A' with the whirling motion B', and the booster port 18' is subsequently opened to back up the thus formed flow of the scavenging gas. The important point here is that the booster flow is less influential after the formation of the whirling motion B' than before the formation of the same.

Instead of providing the ridge 19', the booster port 18' may be located lower than the respective scavenging ports 9'–12'. With this alternative arrangement, the booster port 18' is opened later than the respective scavenging ports 9'–12', so that the above-described function is also achievable.

Secondly, as shown in FIG. 5, the booster port 18' is inclined laterally toward the first pair of scavenging ports 9', 10' by a suitable angle θ 5'. Obviously, the inclined orientation of the booster port 18' intensifies the whirling tendency of the scavenging gas.

Figure 8:
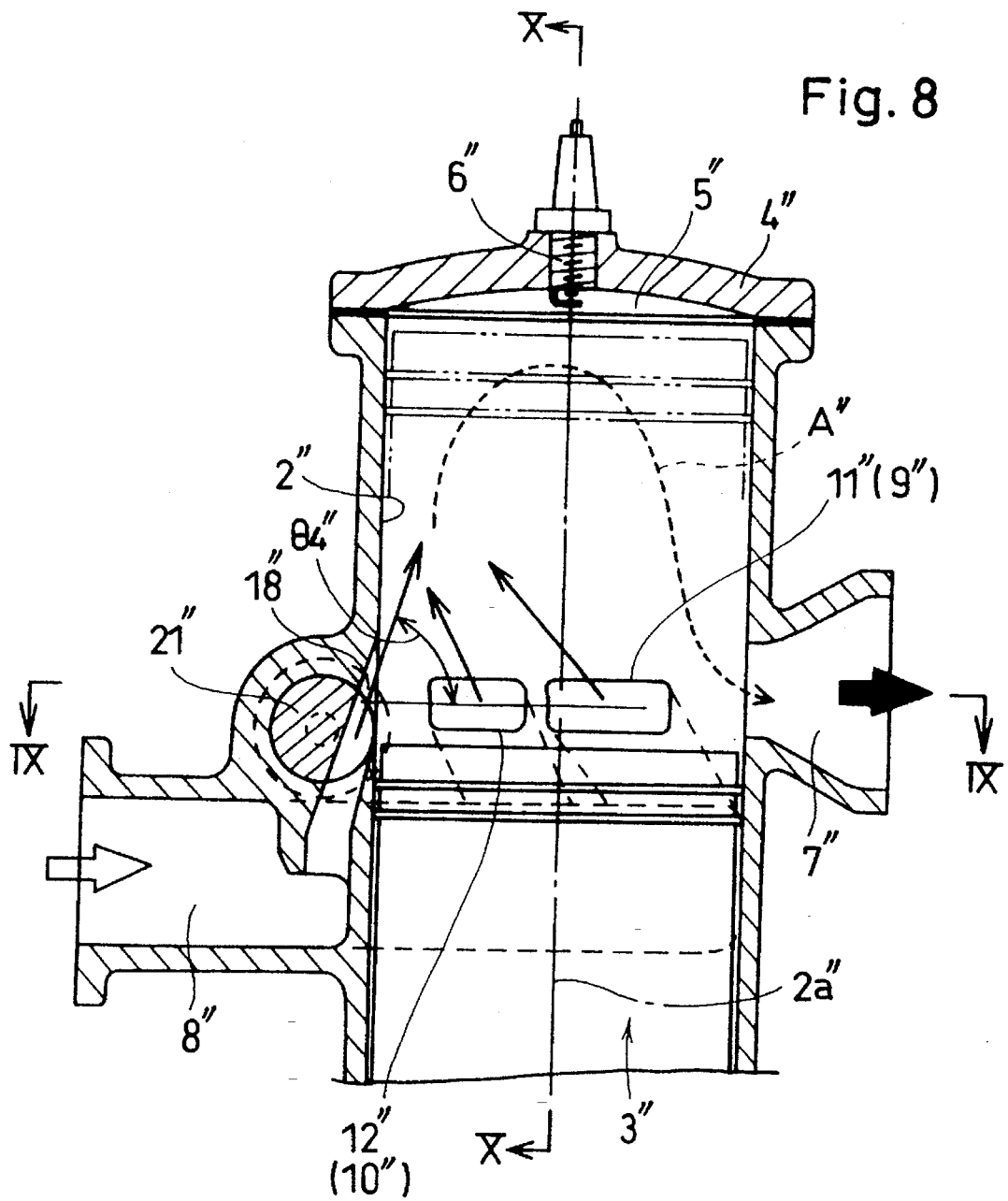
FIG. 8 is a view, in vertical section, showing a two-cycle internal combustion engine according to a third embodiment of the present invention.
Figure 9:
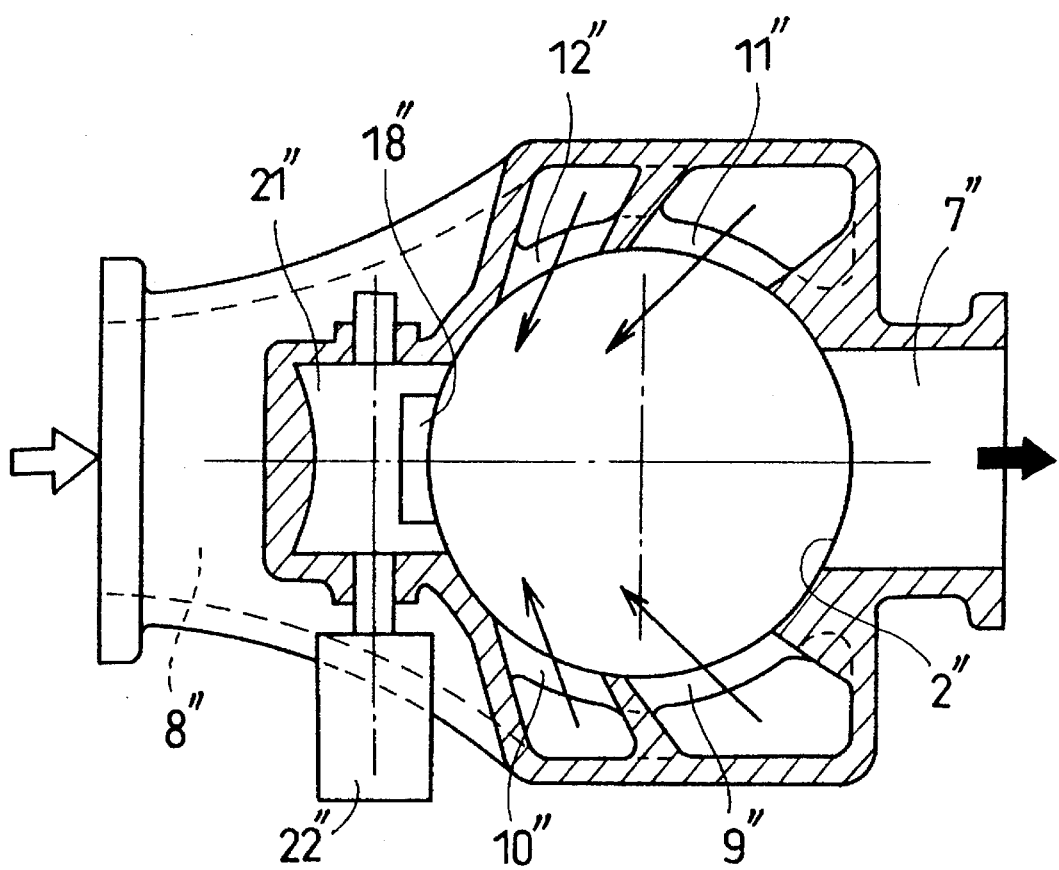
FIG. 9 is a sectional view taken along lines IX—IX in FIG. 8.
Figure 10:
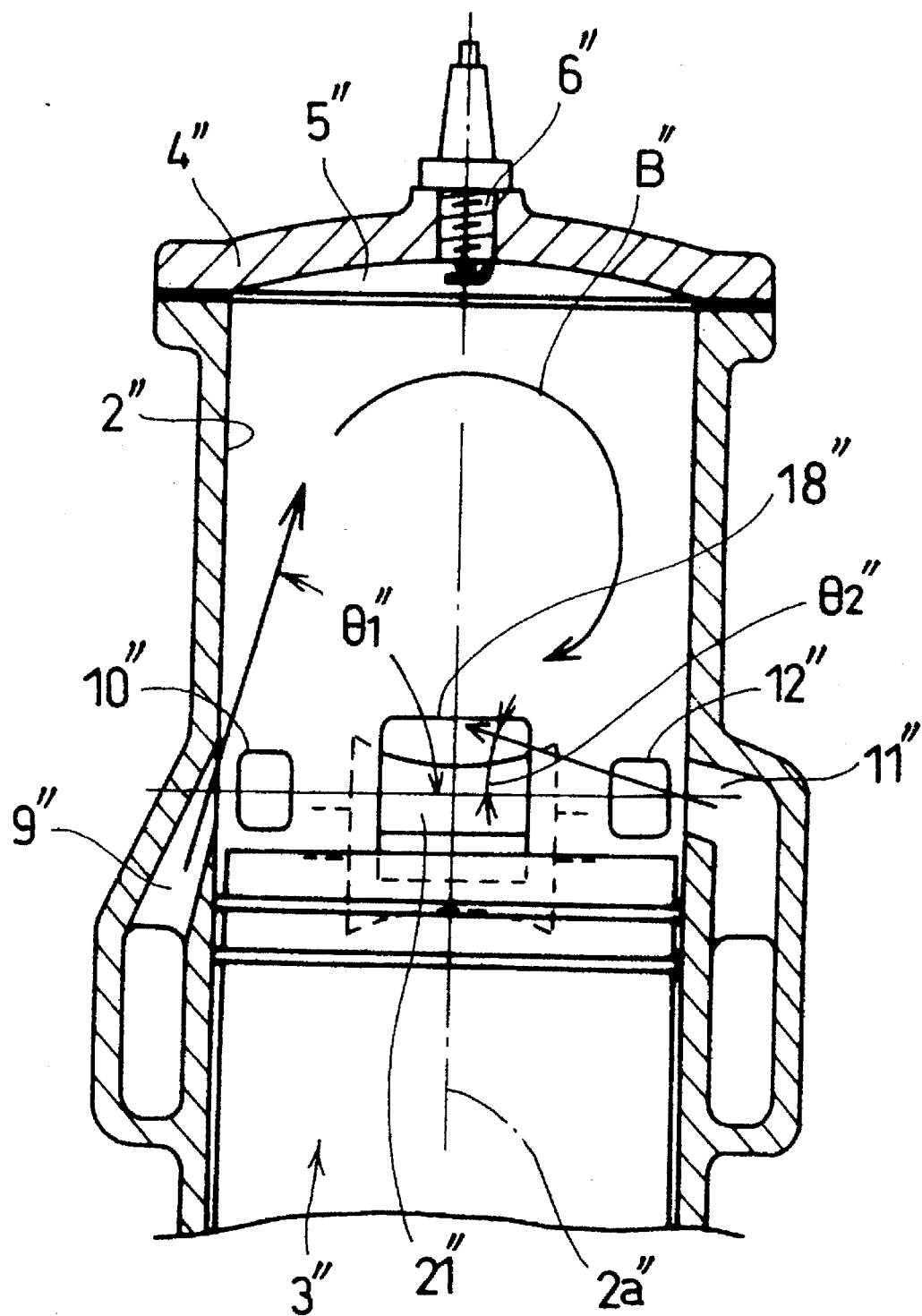
FIG. 10 is a sectional view taken on lines X—X in FIG. 8.

FIGS. 8 to 10 of the accompanying drawings show a third embodiment of the present invention. Like the second embodiment, a cylinder block 1" of this embodiment has a cylinder 2" in which a piston 3" reciprocates vertically. The cylinder block 1" also has an upper end fixedly fitted with a cylinder head 4" which has a downwardly directed recess for defining a combustion chamber 5" in which a sparking portion of a spark plug 6" faces.

As shown in FIG. 9, the cylinder 2" is flanked by a first pair of scavenging ports 9", 10" on one lateral side of the exhaust port 7" as well as by a second pair of scavenging ports 11", 12" on the opposite lateral side of the exhaust port 7". These scavenging ports 9"–12" are equally connected to the charging inlet 18" and oriented away from the exhaust port 7". As a result, the scavenging gas introduced through the scavenging ports 9"–12" is made to move along a standing loop which first extends away from the exhaust port 7", then approaches the spark plug 6", and finally turns to the exhaust port 7", as indicated by a broken line arrow A" in FIG. 8.

The first pair of scavenging ports 9", 10" is inclined by a relatively large angle θ 1" relative to a plane perpendicular to an axis 2a" of the cylinder 2", as shown in FIG. 10. As a result, a portion of the scavenging gas introduced through the first pair of scavenging ports 9", 10" is directed upwardly toward the cylinder head 4".

On the other hand, the second pair of scavenging ports 11", 12" is inclined by a small angle θ 2" of no more than 15 degrees relative to a plane perpendicular to the axis 2a" of the cylinder 2", as also shown in FIG. 10. As a result, another portion of the scavenging gas introduced through the second pair of scavenging ports 11", 12" traverses the cylinder 2" toward an opposite wall portion of the cylinder 2" where the first pair of scavenging ports 9", 10" is formed. Further, the scavenging gas portion introduced through the second pair of scavenging ports 11", 12" joins with the scavenging gas portion introduced through the first pair of scavenging ports 9", 10" to generate a turning flow, as indicated by an arrow B" in FIG. 10. Of course, the second pair of scavenging ports 11", 12" may extend generally' perpendicularly to the axis 2a" of the cylinder 2", like the first embodiment.

According to the third embodiment, again, the cylinder block 1" is additionally provided with a booster port 18" opening into the cylinder 2" at a position opposite to the exhaust port 7". The booster port 18" communicates with the charging inlet 8" and is inclined upwardly toward the spark plug 6" by a relatively large angle θ 4" relative to a plane perpendicular to the axis 2a" of the cylinder 2", as shown in FIG. 8.

According to the third embodiment, further, the booster port 18" is provided with a rotary valve 21" operated by an actuator 22", so that the opening of the booster port 18" is adjustable by the rotary valve 21". The actuator 22" may be made responsive to an operating parameter of the engine such as the opening degree of a throttle valve, the suction pressure, the engine RPM, and etc.

The booster port 18" may be closed by the rotary valve 21" when the engine is operating at a high load wherein the delivery ratio (scavenging ratio) tends to be high. Conversely, the booster port 18" may be opened when the engine is operating at a low load wherein the delivery ratio tends to be low. As a result, it is possible to improve the trapping efficiency and combustion performance of the engine over a wide range of operating conditions.

The preferred embodiments of the present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

We claim:

1. A two-cycle internal combustion engine comprising:

a cylinder in which a piston reciprocates, the cylinder having a top portion provided with a combustion chamber in which a spark plug faces;

an exhaust port laterally opening into the cylinder;

at least one first scavenging port opening into the cylinder at one side of the exhaust port; and at least one second scavenging port opening into the cylinder at another side of the exhaust port opposite to said one side;

wherein each of the first and second scavenging ports directs scavenging gas away from the exhaust port; and wherein the first scavenging port opens into the cylinder with an upward inclination for directing a first portion of the scavenging gas upwardly toward the top portion of the cylinder, while the second scavenging port is oriented to direct a second portion of the scavenging gas transversely of the cylinder toward a wall portion of the cylinder where the first scavenging port is formed.

2. The engine according to claim 1, wherein the second scavenging port opens into the cylinder generally perpendicularly to an axis of the cylinder.

3. The engine according to claim 1, wherein the second scavenging port opens into the cylinder upward at a small inclination angle of no more than 15 degrees relative to a plane perpendicular to an axis of the cylinder.

4. The engine according to claim 1, wherein the piston has a top face provided with a ridge adjacent to the first scavenging port, the ridge having, on a side thereof away from the first scavenging port, a deflecting guide face for deflecting the second portion of the scavenging gas obliquely upward.

5. The engine according to claim 4, wherein the ridge extends to a position facing the exhaust port.

6. The engine according to claim 4, wherein the ridge has, on a side thereof facing the first scavenging port, a non-deflecting guide face inclined substantially in parallel to the first scavenging port.

7. The engine according to claim 1, wherein the combustion chamber is offset away from the exhaust port but close to the first scavenging port.

8. The engine according to claim 7, wherein the combustion chamber has a first steep wall portion located closer to the exhaust port, and a second steep wall portion located closer to the second scavenging port.

9. The engine according to claim 1, further comprising a booster port at a portion of the cylinder opposite to the exhaust port, the booster port opening into the cylinder with an upward inclination for directing a third portion of the scavenging gas upwardly toward the spark plug.

10. The engine according to claim 9, wherein the booster port is also inclined laterally for directing the third portion of the scavenging gas toward the first scavenging port.

11. The engine according to claim 9, further comprising means for delaying an opening time of the booster port relative to the first and second scavenging ports during each downward stroke of the piston.

12. The engine according to claim 11, wherein the means for delaying comprises a ridge formed on top of the piston in facing relation to the booster port.

13. The engine according to claim 9, wherein the booster port is provided with a valve for controlling opening of the booster port.

14. The engine according to claim 13, wherein the valve is operated by an actuator which functions to open the valve under a low delivery ratio operating condition while also functioning to close the valve under a high delivery ratio operating condition.

15. The engine according to claim 13, wherein the valve is a rotary valve.

* * * * *